United States Patent
Roberts et al.

(10) Patent No.: US 10,073,909 B1
(45) Date of Patent: Sep. 11, 2018

(54) EXTRACTION OF TAGS FROM USER-ENTERED FREE TEXT

(71) Applicant: United Services Automobile Association (USAA), San Antonio, TX (US)

(72) Inventors: David W. Roberts, San Antonio, TX (US); Patrick R. Kelley, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 699 days.

(21) Appl. No.: 14/558,512

(22) Filed: Dec. 2, 2014

(51) Int. Cl.
  *G06F 17/30* (2006.01)
  *G06Q 10/04* (2012.01)

(52) U.S. Cl.
  CPC .. *G06F 17/30654* (2013.01); *G06F 17/30268* (2013.01); *G06F 17/30867* (2013.01); *G06F 17/30873* (2013.01); *G06Q 10/04* (2013.01)

(58) Field of Classification Search
  CPC ......... G06F 17/30654; G06F 17/30873; G06F 17/30398; G06F 17/30525
  USPC .................................................. 707/758, 771
  See application file for complete search history.

(56) References Cited

U.S. PATENT DOCUMENTS

| | | | | |
|---|---|---|---|---|
| 6,868,525 | B1* | 3/2005 | Szabo | G06F 17/30067 705/14.53 |
| 2003/0187837 | A1* | 10/2003 | Culliss | G06F 17/30699 |
| 2005/0154692 | A1* | 7/2005 | Jacobsen | G06F 17/2264 706/47 |
| 2013/0212031 | A1* | 8/2013 | Barnfield | G06Q 10/06 705/320 |
| 2013/0297387 | A1* | 11/2013 | Michael | G08G 1/0112 705/13 |
| 2015/0371430 | A1* | 12/2015 | Brewington | G06T 17/05 345/428 |

\* cited by examiner

*Primary Examiner* — Thu-Nguyet Le
(74) *Attorney, Agent, or Firm* — Baker & Hostetler LLP

(57) ABSTRACT

Described herein are systems and methods for supplementing and/or replacing free-entered text with tags, which may be phrases and/or individual words. The tags are then associated with an individual, such as a customer, and the association is stored in a database. At least in part because of the association of the tag with a customer, the tags may be required to be pre-approved. Additionally, a representative that entered the text, and to whom the tags are at least initially displayed, may be given the option of deleting the tag and/or identifying replacement tag(s).

17 Claims, 3 Drawing Sheets

EXTRACTION OF TAGS FROM USER-ENTERED FREE TEXT

BACKGROUND OF THE INVENTION

Member Service Representatives (MSRs) is a term that is generally used to describe individuals that are responsible for interacting with customers on behalf of a company. In that role of managing the customer-company relationship, MSRs may be responsible for keeping notes on active and developing situations with and for the customer. For example, if the customer is considering adjusting the terms of one of the policies with the company, the MSR may want to associate a note with that customer so that subsequent MSRs are familiar with the customer's thoughts. However, empowering MSRs to associate free-written notes with customers opens the possibility that the notes may contain content that one or more departments of the company (e.g., the legal department) may not be comfortable with.

Accordingly there is an unmet need for systems and methods that will extract pre-approved tags (e.g., words and/or phrases) from free-written text, and the tags will be reviewed and approved by the MSR if they accurately relate to the underlying free-written text.

SUMMARY OF THE INVENTION

In one embodiment, described herein are systems and methods for generating and utilizing metadata involving text received from a Member Service Representative (MSR), comparing that text to a set of pre-approved tags, identifying one or more tags that are representative of the text, and displaying the identified one or more tag(s). The MSR may be provided the option of amending the tags, such as by removing one or more identified tags, and/or replacing one or more identified tags with an MSR-selected tag (the selection being, for example, from a list of the pre-approved tags).

One advantage of this approach is that free-written text, which may contain content that is troublesome from the company's legal standpoint, is and will be replaced by content that has been pre-reviewed and thus, pre-approved. Another advantage is that disorganized content, as may be entered by an MSR, will be amended into one or more tags that efficiently identify the fact or facts that the MSR wishes to associate with the customer.

In one or more embodiments, an association between the tag and the customer (that the MSR was speaking with) is stored, and the MSR's free-written text may or may not be also stored and/or associated with the customer.

In another embodiment, the associated tags for other customers may be compared to the associated tags for a selected customer, and such may be used to identify proposed and/or anticipated future activities or services. For example, if other customers have the tag "new driver" associated with their account (immediately) before the customer adds an additional person to their car insurance policy, and the selected customer has the tag "new driver" associated with their account, it may be anticipated that the customer will be adjusting their car insurance policy in the near term (e.g., by adding a child that has just reached the driving age).

BRIEF DESCRIPTION OF THE DRAWINGS

So that those having ordinary skill in the art, to which the present invention pertains, will more readily understand how to employ the novel system and methods of the present invention, certain illustrated embodiments thereof will be described in detail herein-below with reference to the drawings, wherein.

A component or a feature that is common to more than one drawing is indicated with the same reference number in each of the drawings.

DETAILED DESCRIPTION OF CERTAIN EMBODIMENTS

The present disclosure is directed to a tag management device and methods for operating the same in the below illustrated embodiments. It is to be appreciated the subject invention is described below more fully with reference to the accompanying drawings, in which illustrated embodiments of the present invention are shown. The present invention is not limited in any way to the illustrated embodiments as the illustrated embodiments described below are merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof as known to those skilled in the art, and so forth.

It is to be appreciated that certain embodiments of this invention as discussed below are a software algorithm, program or code residing on computer useable medium having control logic for enabling execution on a machine having a computer processor. The machine typically includes memory storage configured to provide output from execution of the computer algorithm or program. As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the invention based on the above-described embodiments.

Accordingly, the invention is not to be limited by what has been particularly shown and described, except as indicated by the appended claims.

Figure 1:
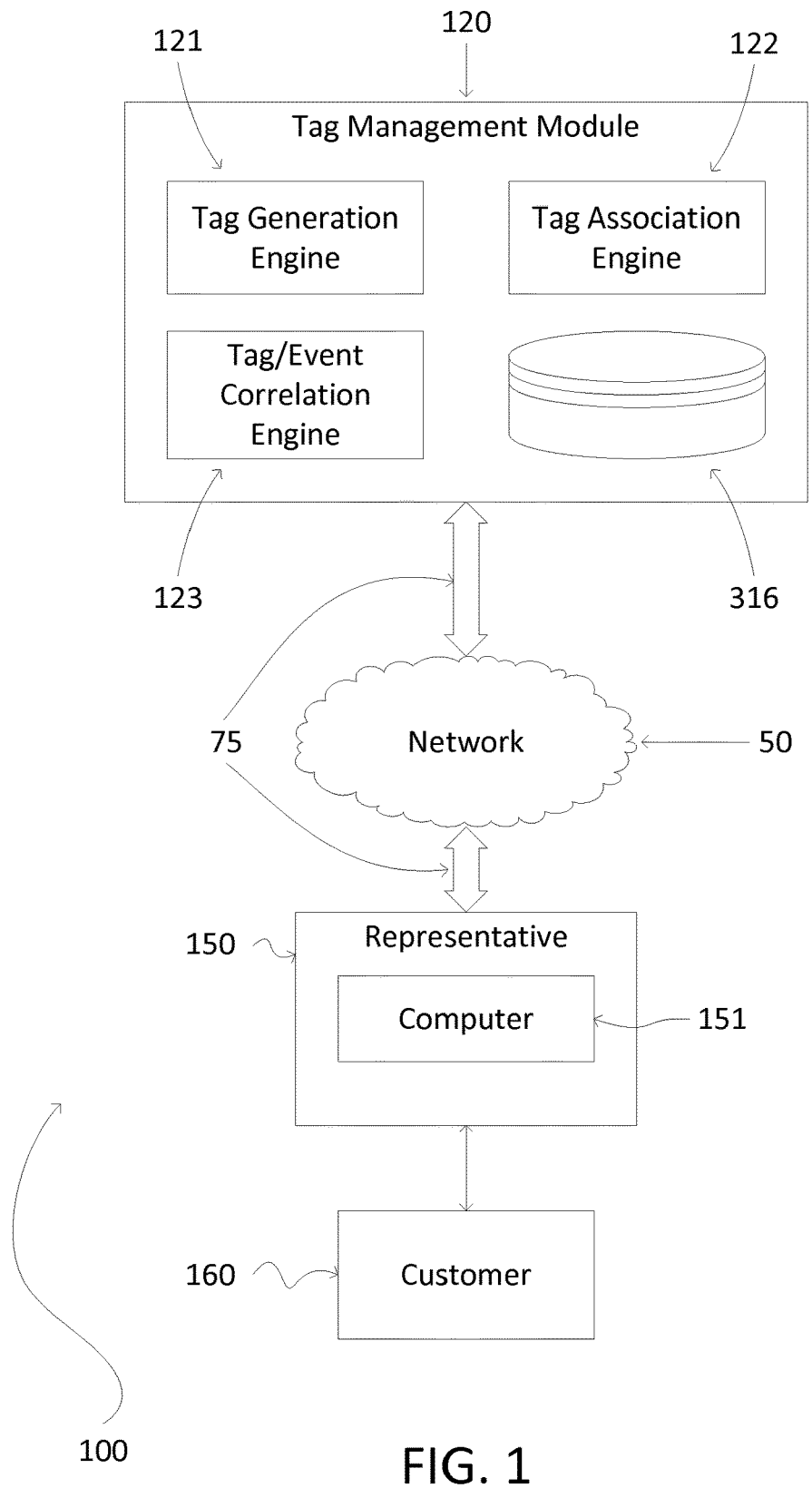
FIG. 1 depicts one embodiment of a system on which a tag management module operates.

Referring to FIG. 1, illustrated therein is a hardware diagram depicting a system 100 in which the processes described herein can be executed. In one example, system 100 includes tag generation engine 121, tag association engine 122, tag/event correlation engine 123, and database 316.

Tag management module 120 in one example is one or more hardware and/or software components residing on a server or computer. In another example, tag management module 120 is one or more hardware and/or software components residing on multiple servers or computers. Thus, it should also be understood that tag management module 120 may be capable of being coupled to other devices, coupled to peripheral devices, coupled to input/output devices, and/or coupled to other systems. Tag management module 120 is represented in the drawings as a standalone device, but it is not limited to such. Tag management module 120 may be coupled to other devices in a distributed processing environment. It must be noted that the functions describe herein may be combined or divided across devices.

Referring further to FIG. 1, it is to be appreciated that network 50 depicted in FIG. 1 may include a local area network (LAN), a wide area network (WAN), a personal area network (PAN), and/or combinations thereof. Such networking environments are commonplace in offices, enterprise-wide computer networks, intranets, and the Internet. For instance, when used in a LAN networking environment, the system 100 is connected to the LAN through a network interface or adapter (not shown). When used in a WAN networking environment, the computing system environment typically includes a modem or other means for establishing communications over the WAN, such as the Internet. The modem, which may be internal or external, may be connected to a system bus via a user input interface, or via another appropriate mechanism. In a networked environment, program modules depicted relative to the system 100, or portions thereof, may be stored in a remote memory storage device such as storage medium. Communication links 75 may comprise either wired or wireless links. It is to be appreciated that the illustrated network connections of FIG. 1 are exemplary and other means of establishing a communications link between multiple devices may be used.

Still referring to FIG. 1, tag generation engine 121 generates and manages a list of tags. In a preferred embodiment, the list of tags includes a plurality of tags, but it is contemplated that the list of tag(s) may include only a single tag. Further, tag generation engine 121 may add, remove, and/or modify the plurality of tags.

In the same embodiment, tag association engine 122 manages an association between tags and customers. For example, if a tag called "moving" is associated with Customer A, that association may be stored in a database. Subsequently, a customer representative may notice that Customer A is moving soon and the customer representative may then act on that information (e.g., call up the customer to ask if they would like to speak with a real estate agent).

In the same embodiment, tag/event correlation engine 123 analyzes text, such as text that has been entered by a customer representative, and determines which tag or tags should be associated with the text. For example, if a member is speaking with a customer and the customer mentions that they are moving, the member may enter text such as "The customer will be moving to Arizona in the next few years."

In this situation, tag/event correlation engine 123 may identify that this text can be associated with the tags "moving" and "selling house." As is evident, it is contemplated herein that tags may be a single word and/or multiple words.

Figure 2:
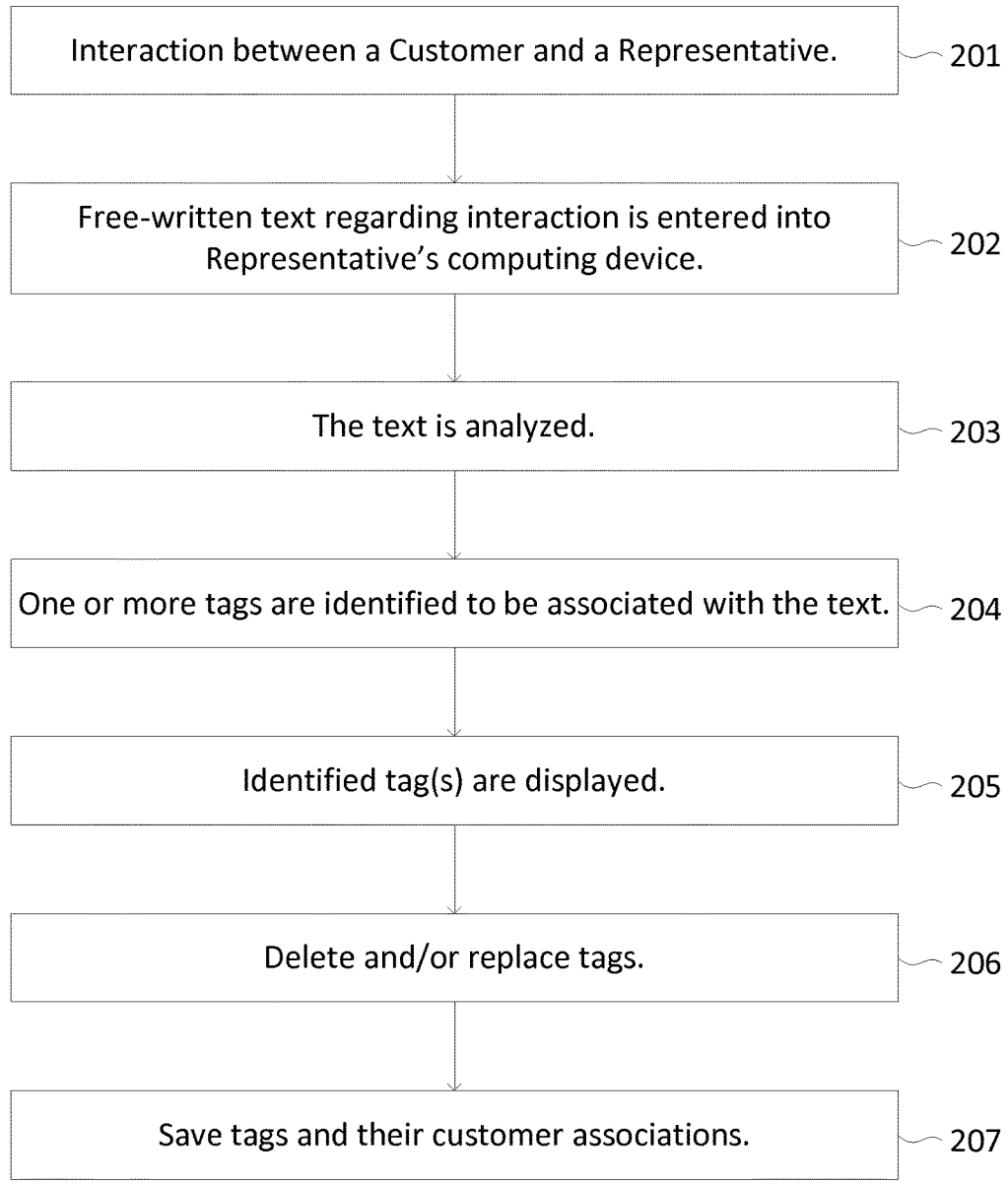
FIG. 2 is a flowchart depicting illustrative operation of the system of FIG. 1.

Referring to FIG. 2, exemplary operation of a process 200 of system 100 will now be described for illustrative purposes. Starting at step 201, a communication is conducted between a customer and a representative. The communication may be via audio (e.g., phone call, including VOIP), audio/video communication, email, online chat, and/or any communication means as would be recognized by those skilled in the art. Subsequently, the representative enters text regarding the interaction (step 202). For example, the representative may enter text such as "The customer is considering moving to Arizona at some point in the future," or "customer moving to AZ?". In one embodiment, audio communications between the customer and the member are translated to text by software and/or a person.

This text may be entered into any software application and subsequently analyzed (step 203). Tag/event correlation engine 123 may identify one or more tags (step 204) that may be utilized to represent the text entered by the representative. These identified tags are presented and displayed to the representative (step 205), and the representative may delete/remove tags and/or add/replace tags (step 206). Finally, the one or more tags, be the remaining tags and/or originally identified tags, are saved and associated with the customer (step 207).

Subsequently, these tags could be queried to identify market segments of members. For example, members that are moving and/or considering moving, those members may be put in touch with moving-related services (e.g., a real estate agent).

It is also contemplated herein that the analysis performed by the one or more embodiments described herein could be analysis of imagery comprised of images, each of which may or may not have been pre-approved. Thus, the analysis could be performed of notations that include, for exemplary purposes only and without limitation, free-written text, images, GIFs, videos, audio recordings, and/or any other information-containing entity as would be recognized by those skilled in the art.

Figure 3:
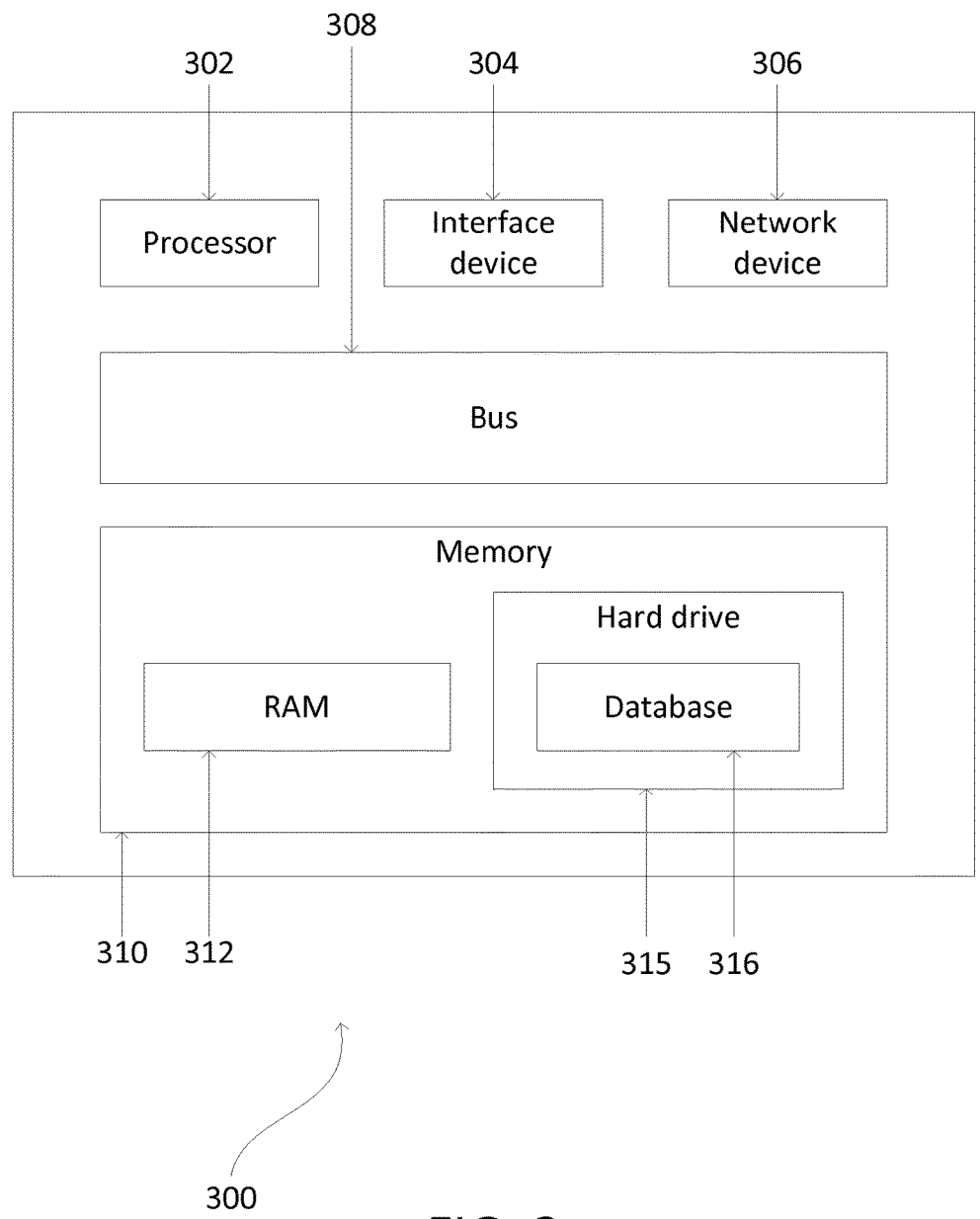
FIG. 3 depicts an exemplary computing device as might be utilized via FIGS. 1 and 2.

Referring to FIG. 3, illustrated therein is an exemplary embodiment of a computing device as might be used when utilizing the systems and methods described herein. In one embodiment, computing device 300 includes memory 310, a processor 302, an interface device 304 (e.g., mouse, keyboard, monitor), a network device 306. Memory 310 in one example comprises a computer-readable signal-bearing medium. One example of a computer-readable signal-bearing medium comprises a recordable data storage medium, such as a magnetic, optical, biological, and/or atomic data storage medium. In another example, a computer-readable signal-bearing medium comprises a modulated carrier signal transmitted over a network coupled with system 100, for instance, a telephone network, a local area network ("LAN"), the Internet, and/or a wireless network. In one example, memory 310 includes a series of computer instructions written in or implemented with any of a number of programming languages, as will be appreciated by those skilled in the art.

Memory 310 in one example includes RAM 312, hard drive 315, which may include database 316. Database 316 in one example holds information, such as information that relates to users and/or parties interacting with system 100. Further, database 316 may reside at any location.

The terms "engine" and "module" denote a functional operation that may be embodied either as a stand-alone component or as an integrated configuration of a plurality of subordinate components. Thus, engines and modules may be implemented as a single engine/module or as a plurality of engine/modules that operate in cooperation with one another. Moreover, engines/modules may be implemented as software instructions in memory 310 or separately in any of hardware (e.g., electronic circuitry), firmware, software, or a combination thereof. In one embodiment, engines/modules contain instructions for controlling processor 302 to execute the methods described herein. Examples of these methods are explained in further detail in the subsequent of exemplary embodiments section-below.

The techniques described herein are exemplary, and should not be construed as implying any particular limitation on the present disclosure. It should be understood that various alternatives, combinations and modifications could be devised by those skilled in the art. For example, steps associated with the processes described herein can be performed in any order, unless otherwise specified or dictated by the steps themselves. The present disclosure is intended to embrace all such alternatives, modifications and variances that fall within the scope of the appended claims.

The terms "comprises" or "comprising" are to be interpreted as specifying the presence of the stated features, integers, steps or components, but not precluding the presence of one or more other features, integers, steps or components or groups thereof.

Although the systems and methods of the subject invention have been described with respect to the embodiments disclosed above, those skilled in the art will readily appreciate that changes and modifications may be made thereto without departing from the spirit and scope of the subject invention.

What is claimed:

1. A computer-implemented method of generating and utilizing metadata from a notation comprising:
    receiving a set of tags;
    receiving, at a computing device with a processor, a notation entered by a representative, wherein the notation is associated with content in a communication between the representative and a customer, wherein the customer is a selected customer and wherein a selected tag is the selected customer's tag, and wherein a database comprises events associated with other customers and tags associated with the other customers;
    analyzing, via the processor, the notation, wherein the notation comprises imagery;
    identifying the selected tag, from the set of tags, to be associated with the notation;
    analyzing the other customers' events and the other customers' tags;
    identifying a correlation between the other customers' events and the other customers' tags,
        wherein the identifying the correlation includes identifying a number of other customers that meet each of the following criteria:
            the identified other customers are each associated with a same correlated event;
            the identified other customers are each associated with a correlated tag that is the same as the selected customer's tag; and
            wherein the identified other customer's correlated tag was stored before the selected customer's correlated event occurred; and
    generating an indication of a predicted event for the selected customer, wherein the predicted event is at least partly based on the correlation between the other customers' events and the other customers' tags.

2. The computer-implemented method of claim 1 further comprising:
    displaying an input interface with the selected tag, the input interface associated with removing the tag;
    receiving an indication that the input interface has been selected; and
    removing the selected tag from computing device's display.

3. The computer-implemented method of claim 1, wherein the notation consists of text, the method further comprising:
    generating an association between the selected tag and the customer; and
    storing said association in the database.

4. The computer-implemented method of claim 1, wherein the predicted event is the customer moving.

5. The computer-implemented method of claim 1, wherein the predicted event is the customer buying a car.

6. The computer-implemented method of claim 1, wherein the predicted event is the customer acquiring health insurance.

7. The computer-implemented method of claim 1 further comprising:
    displaying an input interface with the selected tag, the input interface associated with replacing the tag;
    receiving an indication that the input interface has been selected;
    displaying a list of tags;
    receiving an indication that a selected list tag has been selected; and
    displaying, the selected list tag.

8. The computer-implemented method of claim 1, wherein the selected tag comprises a plurality of selected tags.

9. The computer-implemented method of claim 3, wherein the step of storing said association does not comprise storing the representative-entered text.

10. A non-transitory computer readable storage medium and a computer program embedded therein, the computer program comprising instructions, which when executed by one or more computer systems cause the one or more computer systems to:
    receive a set of tags;
    receive, at a computing device with a processor, text entered by a representative, wherein the text is associated with content in a communication between the representative and a customer, wherein the customer is a selected customer and wherein a selected tag is the selected customer's tag, and wherein a database further comprises events associated with other customers and tags associated with the other customers;
    analyze, via the processor, the text;
    identify the selected tag, from the set of tags, to be associated with the text;
    analyze the other customers' events and the other customers' tags;
    identify a correlation between the other customers' events and the other customers' tags,
        wherein the identifying the correlation includes identifying a number of other customers that meet each of the following criteria:
            the identified other customers are each associated with a same correlated event;

the identified other customers are each associated with a correlated tag that is the same as the selected customer's tag; and wherein the identified other customer's correlated tag was stored before the selected customer's correlated event occurred; and generate a predicted event for the selected customer, wherein the predicted event is at least partly based on the correlation between the other customers' events and the other customers' tags.

11. The non-transitory computer readable storage medium of claim 10, the instructions further causing the one or more computer systems to generate an association between the selected tag and the customer; and store said association in a database.

12. The non-transitory computer readable storage medium of claim 10, the instructions further causing the one or more computer systems to:

display an input interface with the selected tag, the input interface associated with removing the tag;

receive an indication that the input interface has been selected; and remove the selected tag from computing device's display.

13. A computer-implemented method of generating and utilizing metadata comprising:

receiving a set of tags;

receiving, at a computing device with a processor, text, wherein the text is associated with content in a communication between a representative and a customer;

analyzing, via the processor, the text;

identifying a tag, from the set of tags, to be associated with the text;

analyzing the other customers' events and the other customers' tags;

identifying a correlation between the other customers' events and the other customers' tags, wherein the identifying the correlation includes identifying a number of other customers that meet each of the following criteria:

the identified other customers are each associated with a same correlated event;

the identified other customers are each associated with a correlated tag that is the same as a selected customer's tag; and wherein the identified other customer's correlated tag was stored before the selected customer's correlated event occurred; and generating a predicted event for the selected customer, wherein the predicted event is at least partly based on the correlation between the other customers' events and the other customers' tags.

14. The computer-implemented method of claim 13 further comprising:

displaying an input interface with the identified tag, the input interface associated with removing the tag;

receiving an indication that the input interface has been selected; and removing the identified tag from computing device's display.

15. The computer-implemented method of claim 13 further comprising:

displaying an input interface with the identified tag, the input interface associated with replacing the identified tag;

receiving an indication that the input interface has been selected; displaying a list of tags; and receiving an indication that a tag has been selected; and displaying, the selected tag.

16. The computer-implemented method of claim 15, wherein the selected tag is displayed instead of the identified tag.

17. The computer-implemented method of claim 15, wherein the text is at least partially generated by audio-to-text software.

* * * * *